(12) United States Patent
Rybarz et al.

(10) Patent No.: US 10,774,934 B2
(45) Date of Patent: Sep. 15, 2020

(54) MOUNTING OF A FLAP VALVE SHAFT

(71) Applicant: Tenneco GmbH, Edenkoben (DE)

(72) Inventors: Marek Rybarz, Wodzislaw Slaski (PL);
Rico Weinert, Gommersheim (DE)

(73) Assignee: Tenneco GmbH, Edenkoben (DE)

( * ) Notice: Subject to any disclaimer, the term of this patent is extended or adjusted under 35 U.S.C. 154(b) by 42 days.

(21) Appl. No.: 15/815,866

(22) Filed: Nov. 17, 2017

(65) Prior Publication Data

US 2018/0142790 A1 May 24, 2018

(30) Foreign Application Priority Data

Nov. 21, 2016 (DE) .......................... 10 2016 122 369

(51) Int. Cl.
| | | |
|---|---|---|
| *F16K 1/22* | (2006.01) | |
| *F16C 25/08* | (2006.01) | |
| *F16C 17/08* | (2006.01) | |
| *F16C 23/04* | (2006.01) | |
| *F16K 15/03* | (2006.01) | |
| *F16C 32/02* | (2006.01) | |

(52) U.S. Cl.
CPC .............. *F16K 1/224* (2013.01); *F16C 17/08* (2013.01); *F16C 23/045* (2013.01); *F16C 25/083* (2013.01); *F16K 15/03* (2013.01); *F16C 32/02* (2013.01)

(58) Field of Classification Search
CPC .......... F16K 1/224; F16K 15/03; F16C 17/08; F16C 23/045
See application file for complete search history.

(56) References Cited

U.S. PATENT DOCUMENTS

| | | | |
|---|---|---|---|
| 4,079,747 A | 3/1978 | Roberts | |
| 4,351,361 A | 9/1982 | Worley | |
| 5,722,227 A | 3/1998 | Stahlecker | |
| 9,291,273 B2 | 3/2016 | Lurk et al. | |
| 2007/0131889 A1* | 6/2007 | Unbehaun | F16K 41/026 251/305 |
| 2012/0043489 A1* | 2/2012 | Olberding | F16K 1/16 251/337 |

FOREIGN PATENT DOCUMENTS

| | | | | |
|---|---|---|---|---|
| CH | 469216 A | * | 2/1969 | ........... F16K 5/0636 |
| DE | 69007957 T2 | | 10/1994 | |
| DE | 4426028 C1 | | 11/1995 | |

(Continued)

*Primary Examiner* — Marina A Tietjen
(74) *Attorney, Agent, or Firm* — Harness, Dickey & Pierce, P.L.C.

(57) ABSTRACT

The invention relates to a bearing system 1 of a flap valve 6 consisting of a valve shaft 1.1 with a valve shaft pivot 1.2, and consisting of a separate bearing body 2 which is fastened on the end side to the valve shaft 1.1, and of a valve housing wall 3 which has a shaft bearing 3.1 in the form of a depression, the bearing body 2 being guided rotatably in the depression 3.1. Here, the bearing body 2 has a recess 2.1, into which a separate bearing piece 4 is inserted, the valve shaft 1.1 bearing indirectly via the bearing body 2 and the bearing piece 4 against the housing-side shaft bearing 3.1, the bearing body 2 and the bearing piece 4 being formed from different metals or different materials.

10 Claims, 3 Drawing Sheets

(56) References Cited

FOREIGN PATENT DOCUMENTS

Figure 1:
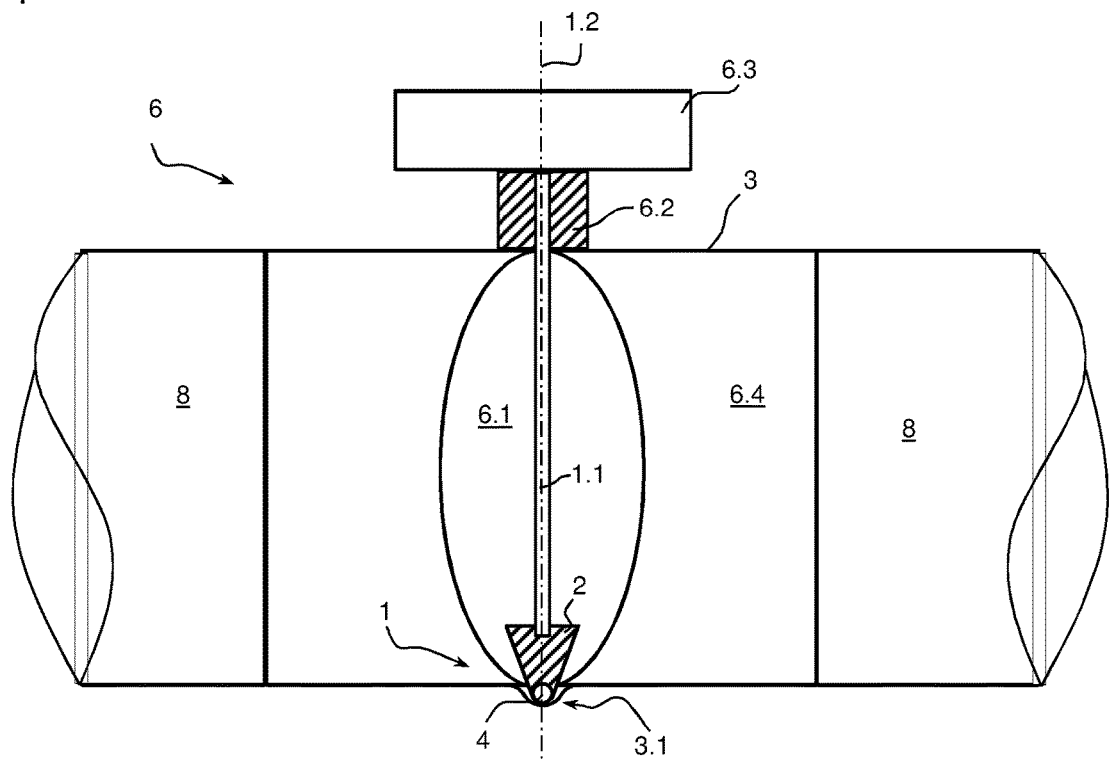

| DE | 19602926 C1 | 5/1997 |
| DE | 102004032845 A1 | 2/2006 |
| DE | 102009052423 A1 | 5/2011 |
| EP | 2600042 A1 | 6/2013 |
| WO | WO-2010108620 A1 | 9/2010 |

* cited by examiner

MOUNTING OF A FLAP VALVE SHAFT

The invention relates to a bearing system of a flap valve consisting of a valve shaft with a valve shaft pivot for a valve flap and a bearing body, and consisting of a valve housing wall which has a shaft bearing in the form of a depression, the bearing body being guided at least indirectly in the depression such that it can be rotated about the valve shaft pivot, and it being possible for said bearing body to bear at least indirectly against the shaft bearing in the axial direction A with respect to the valve shaft pivot, the bearing body having a recess, into which a bearing piece is inserted, the bearing piece bearing against the shaft bearing, with the result that the bearing body is guided such that it can bear indirectly via the bearing piece against the shaft bearing and can be rotated about the valve shaft pivot. In addition to the axial stop against the valve housing wall, a positively locking connection in the radial direction with respect to the valve shaft pivot is also ensured by way of the depression. The valve shaft can also be an integral constituent part of the valve flap.

An exhaust gas flap is necessary within an exhaust gas system, in order to ensure an appropriate acoustic behavior and sufficient exhaust gas back pressure. The gas volumetric flow is regulated via the exhaust gas flap. To this end, the exhaust gas flap is coupled to a driven shaft, with the result that the exhaust gas pipe cross section is changed by way of opening or closing thereof. The drive of the shaft takes place indirectly or directly via an actuator.

The movability of the shaft is ensured by way of bearings within the valve housing. Two-sided shaft bearings usually come into consideration as bearings. As an alternative, a shaft bearing is provided on one side and a pin bearing is provided in a depression on the opposite side. As a rule, the bearing outer ring and/or the pin bearing are/is made from different materials than the bearing shaft and/or the depression in the valve housing. Material pairings are considered here, in the case of which wear and friction are minimized. Ceramic and metal alloys in the form of sintered metal or cast iron come into consideration for the material pairing.

Each bearing has to ensure exact positioning and movability. A prestress is provided between the bearing parts, in order to obtain a corresponding bearing force, and in order to avoid relative movements within the bearing.

The ceramic pin bearing is connected directly to the valve shaft. Corresponding tolerances have to be used on account of different coefficients of thermal expansion between the ceramic and the metal alloy.

The difficulties in the case of a bearing concept of this type lie in the configuration of said connection between the ceramic and the metallic bearing part. Undesired noise can be produced on account of relative movements as a result of vibration, pulses or another excitation.

In addition to the wear resistance and the satisfactory sliding properties, a further requirement is the temperature resistance. In addition, satisfactory corrosion resistance is necessary for an application at the end of the exhaust gas system.

A difficulty in the case of the use of ceramic/metal pairings in regions with temperature fluctuations is the very different coefficients of thermal expansion of the two materials. This can lead to fractures of the ceramic or separation phenomena between the ceramic and the metal.

A bearing system of a flap valve shaft has already been disclosed by WO 2010/108620 A1. The bearing system has a bearing body with a recess, in which a spherical segment which is connected to the flap is mounted rotatably. The bearing body is axially supported or prestressed via a spring arrangement with respect to the housing.

DE 10 2009 052 423 A1 has likewise disclosed a bearing system of a flap valve shaft. Here, the flap valve shaft has a bearing pin on the end side, which bearing pin is mounted rotatably within a depression of the valve housing.

U.S. Pat. No. 4,079,747 A has also disclosed a bearing system of a flap valve shaft. Here, the flap which is formed from fire-resistant material has a molded ceramic bearing pin on the end side, which bearing pin is mounted rotatably within a cylindrical depression of the valve housing. The bearing pin is cylindrical and flat on the end side. Tolerances between the bearing pin and the depression in the radial direction cannot be compensated for. The valve housing and the depression are lined with ceramic.

DE 196 02 926 C1 has disclosed a bearing system for a worm. The worm is mounted on a shaft which has recesses on the end side, in which recesses flattened balls are arranged. Furthermore, a sheet-metal pressure plate is provided which is supported via an elastomeric or rubber spring on the rear wall of the recess.

DE 690 07 957 T2 discloses a two-piece ring and a valve flap, the valve flap being positioned in the ring. The ring has depressions, in which the valve flap is mounted rotatably. Here, the balls engage into the two depressions of the ring and into two recesses of the valve flap.

DE 10 2004 032 845 A1 discloses a bearing system for a flap valve for the exhaust gas system of a motor vehicle. Said bearing system comprises a bearing body which is fixed on the valve flap and engages into a bowl-shaped depression in the wall of the valve housing.

U.S. Pat. No. 5,722,227 A has disclosed a further bearing system for a spinning machine. The bearing system comprises a shaft which tapers on the end side and against which a spherical bearing piece bears directly. The spherical bearing piece is fixed via the shoulder of a bearing body which encloses the shaft on the edge side.

U.S. Pat. No. 9,291,273 B2 discloses the bearing system of a throttle valve. Said bearing system has a substantially pin-shaped bearing body. The first end of the bearing body is fastened directly to a shaft which is provided integrally in the flap.

U.S. Pat. No. 4,351,361 discloses a bearing system of a valve flap. Said bearing system comprises a bearing body which is fastened directly to the shaft of the valve flap. The bearing body is rounded toward the valve housing and is positioned in a depression of the valve housing.

EP 2 600 042 A1 discloses the bearing system of a valve. The valve flap is pivoted via a shaft, the shaft having a recess, in which a bearing body and a bearing piece are provided.

The invention is based on the object of configuring and arranging a bearing system of a flap valve shaft in such a way that an improved acoustic behavior and an improved service life are ensured.

According to the invention, the object is achieved by virtue of the fact that the bearing body is fastened on the end side to the valve shaft, and that the bearing body and the bearing piece are formed from different metals or different materials, or that the bearing body is formed from metal and the bearing piece is formed from a ceramic material. The valve shaft can therefore bear against the housing-side shaft bearing and can be guided indirectly via the bearing body and the bearing piece.

This achieves a situation where firstly the bearing body can be formed from similar material to the valve shaft, for example from metal, with the result that the bearing body can be connected permanently to the valve shaft in a simple way, such as by way of welding; the latter, for example, by way of brazing or welding. This ensures an optimum acoustic behavior of said connection. Secondly, a bearing piece can be used which is formed from a different material than the bearing body. The bearing piece can also be replaced independently of the bearing body if wear phenomena make this necessary.

The bearing body can therefore be connected fixedly to the valve shaft in a simple way.

The bearing body can also be formed from stainless steel, sintered metal or cast iron. The materials which are used have to be temperature-resistant and corrosion-resistant overall.

The bearing piece can be formed from a different metal than the bearing body, in particular from wear-resistant metal or from ceramic.

Moreover, another material can be selected for the bearing piece, with the result that optimum plain bearing properties, in particular low friction and consequently low wear, can be achieved.

In the case of applications everywhere in a motor vehicle, the valve housing wall and/or the shaft bearing are/is as a rule also formed from metal. The metal/ceramic pairing between the bearing piece and the shaft bearing ensures a very satisfactory friction and wear behavior.

In addition, the ceramic bearing piece has a lower coefficient of thermal expansion than the metallic bearing body. Accordingly, an increased play will be produced in the event of heating and, in the case of a prestress, a reduced prestressing force between the bearing body and the bearing piece will be produced. As will be described below, this has a positive effect on the metering of lubricant.

The invention relates to a flap valve having a valve housing for connecting to an exhaust gas system and a flap valve with a bearing system as described.

Furthermore, it can be advantageous if the bearing piece is mounted within the recess of the bearing body such that it can be moved in the axial direction A with respect to the valve shaft pivot, a prestressing element being provided within the recess, by which prestressing element the bearing piece can be prestressed relative to the bearing body in the axial direction A with respect to the valve shaft pivot. The prestressing element ensures a relatively constant axial holding or bearing force. The acoustic behavior can be improved by way of the prestress or the axial holding or bearing force because vibration noise is prevented. A prestress of the valve shaft itself with respect to the valve housing is therefore not necessary. The prestressing element is preferably configured as a spring which consists of a steel alloy or nickel alloy.

It can also be advantageous if the bearing piece is fixed within the recess of the bearing body in the axial direction A with respect to the valve shaft pivot. Owing to a lack of an axial relative movement between the bearing piece and the bearing body, a prestress of the valve shaft with respect to the valve housing by means of a further prestressing element outside the recess is advantageous.

It can be advantageously provided here that the bearing piece and the bearing body have a positively locking connection which acts in the axial direction A with respect to the valve shaft pivot, the positively locking connection a) being configured as a one-sided stop, against which the bearing piece can bear under prestress, or b) fixing the bearing piece in the axial direction with respect to the valve shaft pivot in both directions. The positively locking connection prevents the bearing piece from falling out; the latter even in the case with axial movement freedom and with axial prestress by way of the prestressing element.

It can be of significance for the present invention if the positively locking connection is configured as a shoulder, for example in the form of a beaded edge which is molded into the recess after the insertion of the bearing piece. The shoulder therefore forms an undercut in relation to the opening cross section of the recess, with the result that the one-sided stop is ensured and the bearing piece is prevented from falling out.

It can advantageously be provided that, at least at operating temperature, the bearing piece can be moved in the circumferential direction with respect to the valve shaft pivot relative to the bearing body or has a slight play in the radial direction. There is no non-positive connection in the circumferential direction between the bearing piece and the bearing body, at least at operating temperature. A positively locking connection exists only in the axial direction A and in a radial direction and optionally in the circumferential direction with respect to the valve shaft pivot. The overall play ensures the discharge of lubricant.

It can be advantageous in conjunction with the configuration and arrangement according to the invention if a cavity is provided within the recess between the bearing piece and the bearing body, in which cavity lubricant can be stored or is stored. The friction and wear behavior are improved considerably by way of the separate lubricant. Lubricant is conveyed out of the cavity and between the bearing piece and the shaft bearing or the depression by way of the existing gap between the bearing piece and the bearing body and by way of the relative movement between the bearing piece and the bearing body. Lubricant can be discharged to an increased extent, at least in the warm state or at operating temperature, by virtue of the fact that the play and therefore the gap between the bearing body and the bearing piece are increased during heating.

Furthermore, it can be advantageous if the recess has a beaded edge which forms the undercut and the positively locking connection with the bearing piece in the axial direction A, the bearing piece having a region B1 with a diameter d1 and a region B2 with a diameter d2, where d1>d2, the region B1 bearing against the beaded edge within the recess for the purpose of the formation of the positively locking connection. The two different diameters d1, d2 establish a shoulder which can bear against the edge.

Moreover, it can be advantageous if the bearing piece is of spherical configuration or the bearing piece is of pin-shaped configuration and has a shoulder which is arranged within the recess and bears against the edge. Other shapes such as frustoconical are also possible. The only requirement is a thickened portion which is positioned within the recess and can establish the positively locking connection with the edge.

Further advantages and details of the invention are described in the patent claims and in the description and are shown in the figures, in which:

FIG. 1 shows an outline sketch of a flap valve integrated into an exhaust gas system, and FIGS. 2-6 show an outline sketch of the detailed view for mounting the valve shaft.

FIG. 1 shows a flap valve 6 which is integrated within an exhaust gas system 8 consisting of two exhaust gas pipes. The flap valve 6 has a valve housing 6.4, within which a valve flap 6.1 with a valve shaft pivot 1.2 is arranged. The valve flap 6.1 is mounted in relation to the valve shaft pivot 1.2 via an upper sleeve bearing or shaft bearing 6.2 and a lower bearing system 1 within the housing 6.4. The valve flap 6.1 is driven via a drive 6.3. The bearing system 1 is formed by way of a bearing body 2 which is connected to the valve shaft 1.1 and/or the valve flap 6.1, and a bearing piece 4 which is arranged therein. The bearing piece 4 is positioned within a depression 3.1 of the valve housing wall 3.

Figure 2:
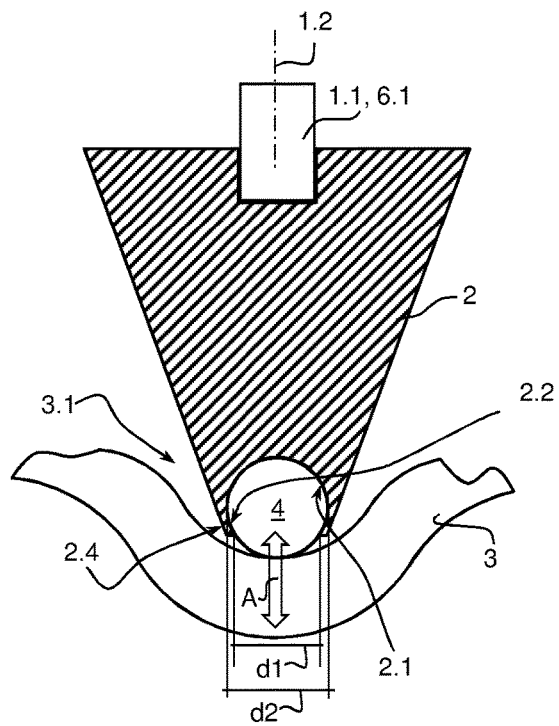

FIG. 2 shows said situation in detail as follows.

The bearing body 2 is connected directly to the valve shaft 1.1 or, in the case of a valve shaft 1.1 which is contained integrally within the valve flap 6.1, to the valve flap 6.1. Material with a comparable or similar coefficient of thermal expansion, in particular metal, comes into consideration both for the shaft 1.1 and/or the flap 6.1 and for the bearing body 2, with the result that welding or brazing of the two components is possible for connecting purposes. The bearing body 2 has a recess 2.1 at the lower end. The bearing piece 4 is arranged within said recess 2.1. According to FIG. 2, the bearing piece 4 is a ball, preferably made from ceramic material, which is mounted within the recess 2.1. In order that the bearing piece 4 does not fall out, the recess 2.1 has an undercut 2.2, with the result that the diameter d2 of the bearing piece 4 is greater than the opening diameter d1 of the recess 2.1. The undercut 2.2 can be provided all the way around, or else only over a part circumference.

In the region of said bearing system 1, the valve housing wall 3 has a depression 3.1 which is configured as a shaft bearing and within which the bearing body 2 comes into contact via the bearing piece 4. The contact takes place, in particular, in the axial direction A. Moreover, the bearing piece 4 is at least guided in the radial direction on account of the trough-shaped form of the depression 3.1. An exact relative movement between the bearing body 2 and the valve housing wall 3 in the circumferential direction U (see FIG. 3) is therefore ensured.

Figure 3:
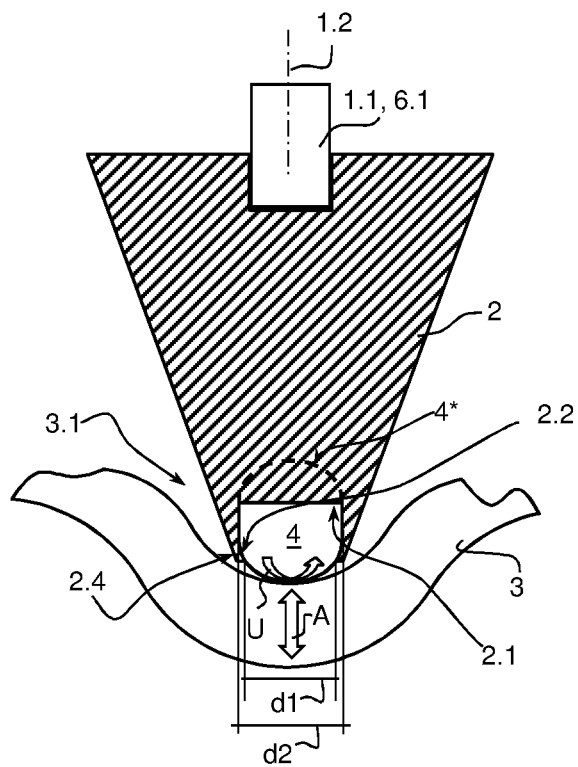

In contrast to the exemplary embodiment of FIG. 2, the exemplary embodiment of FIG. 3 is a bearing piece 4 of cylindrical configuration on one side which is positioned within a corresponding recess 2.1 within the bearing body 2. The bearing piece 4 is flat on its upper side and bears against the bearing body 2 onto a correspondingly flat inner wall 2.5 within the recess 2.1. As an alternative (shown using dashed lines), the bearing piece 4\* can also be of spherical configuration on its upper side. This is associated with relatively simple assembly and an optimum pressure distribution in the bearing piece 4\* in the case of axial prestress or pressure of the bearing piece 4\*. The underside of the bearing piece 4 is of spherical configuration and comes into contact in the axial direction A within the depression 3.1, as is also the case according to the exemplary embodiment of FIG. 2.

Figure 4:
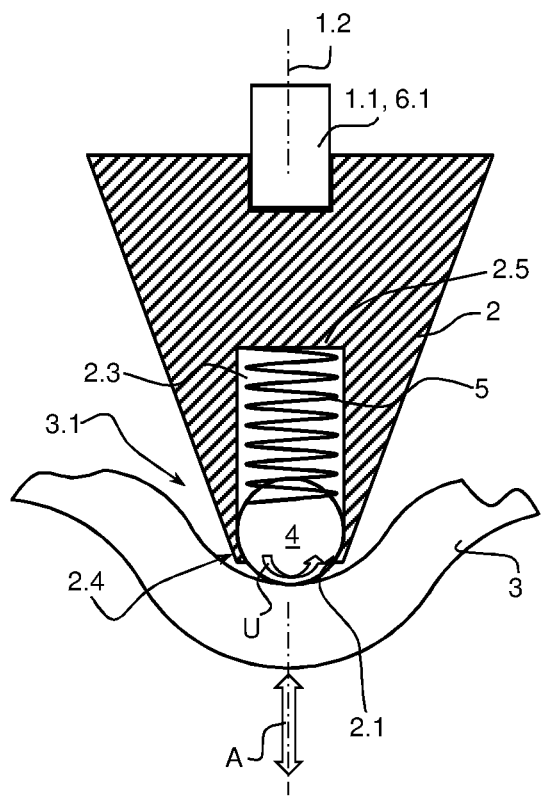

According to the exemplary embodiment of FIG. 4, the bearing piece 4 is configured as a ball, as is also the case according to FIG. 2. The recess 2.1 is widened. It extends substantially more deeply into the bearing body 2, with the result that a prestressing element 5 which is configured as a spring is provided between the bearing piece 4 and the inner wall 2.5 of the bearing body 2. The bearing piece 4 is prestressed via the prestressing element 5 or the spring against the undercut 2.2 or the edge 2.4 which is formed in this way. Said prestressing acts in the axial direction A. As long as the bearing piece 4 does not bear against the edge 2.4 of the undercut 2.2 on account of the relative position between the valve shaft 1.1 and the valve housing wall 3, a prestress of the valve shaft 1.1 with respect to the valve housing wall 3 takes place in this case.

Figure 5:
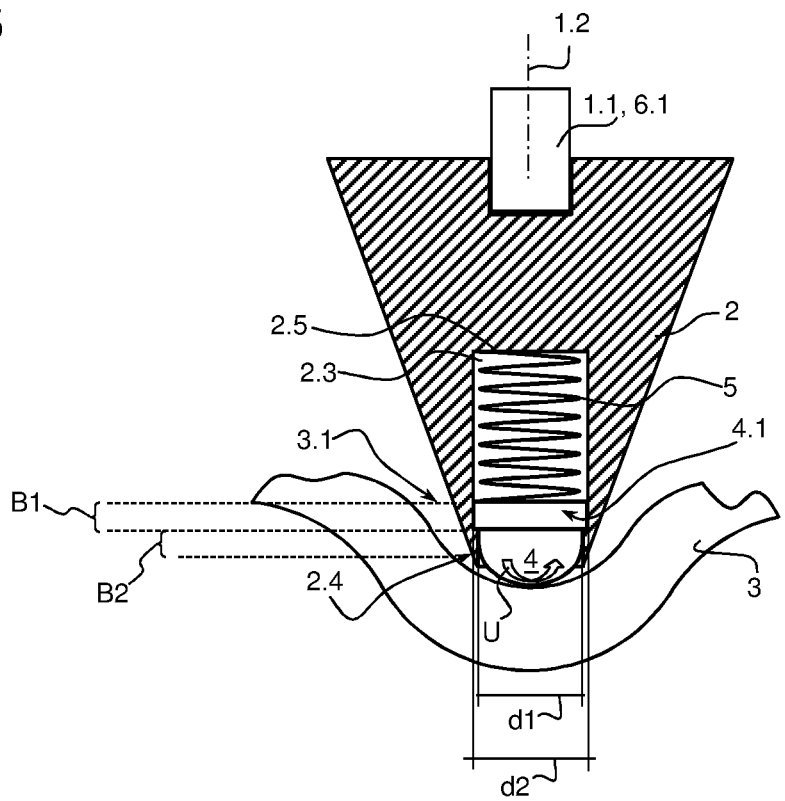

A spring 5 is likewise provided in the exemplary embodiment of FIG. 5. In this case, the bearing piece 4 is likewise of cylindrical or piston-shaped configuration. For the purpose of bearing against the edge 2.4 of the undercut 2.2, the bearing piece 4 has a shoulder 4.1 with a diameter d2 which is of greater configuration than an opening cross section d1 of the recess 2.1. The bearing piece 4 consequently has a region B1, the diameter d1 of which is greater than a diameter d2 of a region B2. This applies correspondingly to the bearing pieces 4 according to the exemplary embodiment of FIGS. 2 to 4 and FIG. 6.

Figure 6:
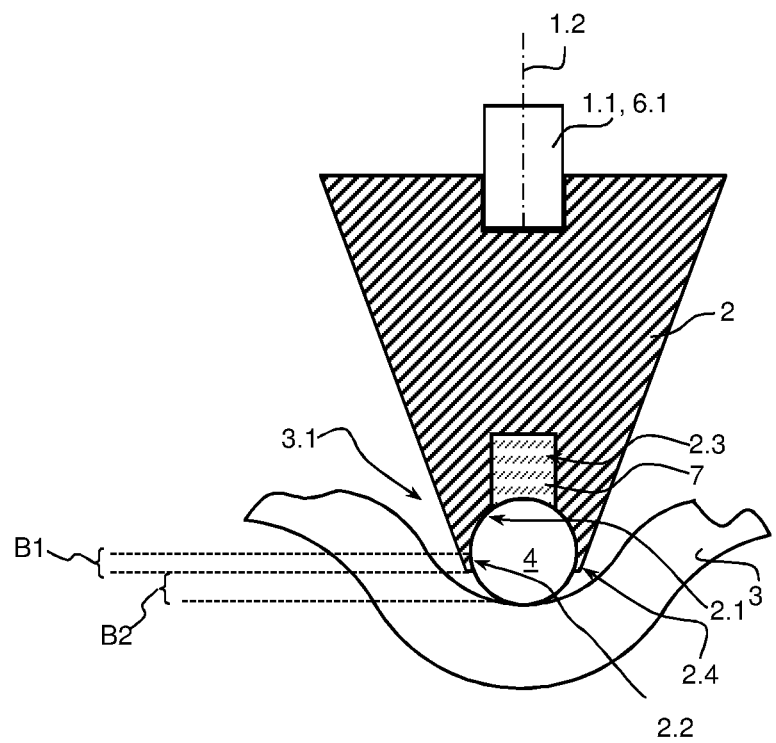

As can be seen according to FIG. 6, the bearing piece 4 is once again spherical. The region B1 of the bearing piece 4 has a greater diameter than the region B2, with the result that the bearing piece 4 bears in the region B1 against the edge 2.4 of the undercut 2.2.

In the exemplary embodiments of FIGS. 4, 5 and 6, a cavity 2.3 in the form of a recess 2.1 which is widened in the axial direction A is provided above the bearing piece 4, in which recess 2.1 the spring 5 is provided according to the exemplary embodiment of FIGS. 4 and 5. In all three exemplary embodiments, a lubricant 7 can be stored within said cavity 2.3, as shown in FIG. 6. The lubricant 7 is transported gradually out of the recess 2.1 or the cavity 2.3 on account of the relative movement between the bearing piece 4 and the bearing body 2 and on account of the gap which exists between the bearing piece 4 and the bearing body 2, and ultimately passes into the shaft bearing 3.1 and consequently into the depression at the contact point between the bearing piece 4 and the valve housing wall 3.

According to the exemplary embodiments of FIGS. 4 and 5, the gap between the bearing piece 4 and the edge 2 4 of the bearing body 2 becomes greater, in particular, when the bearing piece 4 is prestressed inward counter to the spring force and, in this case, loses its contact with the edge 2.4 of the undercut 2.2. According to the exemplary embodiments of FIGS. 2, 3 and 6, it is to be determined that the gap which exists between the bearing piece 4 and the bearing body 2 is smallest in the cold state. With increasing heating, in particular at operating temperature, the gap will become considerably greater. This is because the coefficient of thermal expansion of a ceramic component, such as the bearing piece 4 here, is as a rule provided to be lower than that of a metallic component, such as for the bearing body 2 here. At operating temperature, in particular, a sufficient discharge of lubricant 7 from the undercut 2.2 is accordingly ensured.

A radial tolerance compensation is ensured by way of the part-spherical contact between the bearing piece 4, 4\* and the bearing body 2, that is to say tolerances in the radial direction can be compensated for by way of an axial feed movement or prestress, with the result that rattling noise is avoided. The part-spherical contact exists on the upper side of the bearing piece 4, 4\* according to the exemplary embodiment of FIGS. 2, 3 and 6, and on the underside of the bearing piece 4 according to the exemplary embodiment of FIG. 4, where it bears against the part-spherical undercut 2.4.

LIST OF DESIGNATIONS

Bearing system
1.1 Valve shaft
1.2 Valve shaft pivot
2 Bearing body
2.1 Recess
2.2 Undercut
2.3 Cavity
2.4 Edge
2.5 Inner wall
3 Valve housing wall 3.1 Depression, shaft bearing
4 Bearing piece
4* Bearing piece, alternative shape
4.1 Shoulder
5 Prestressing element, spring
6 Flap valve
6.1 Valve flap
6.2 Sleeve bearing, shaft bearing
6.3 Drive
6.4 Valve housing
7 Lubricant
8 Exhaust gas system
A Axial direction
B1 Region
B2 Region
d1 Diameter, width
d2 Diameter, width
U Circumferential direction

The invention claimed is:

1. A bearing system of a flap valve, comprising:
a valve shaft with a valve shaft pivot for a valve flap, a bearing body, and a valve housing wall which has a shaft bearing in the form of a depression, the bearing body being guided at least indirectly in the depression and being rotatable about the valve shaft pivot, said bearing body being adapted to bear at least indirectly against the shaft bearing in an axial direction A with respect to the valve shaft pivot, the bearing body having a recess, into which a bearing piece is inserted, the bearing piece bearing against the shaft bearing, with the result that the bearing body is guided such that it bears indirectly via the bearing piece against the shaft bearing and is rotatable about the valve shaft pivot, wherein the bearing body is fastened on an end side to the valve shaft, the bearing body and the bearing piece are formed from different materials, wherein the bearing body and the valve shaft are connected permanently by brazing or welding.

2. Bearing system according to claim 1, wherein the bearing piece is mounted within the recess of the bearing body and moveable in the axial direction A with respect to the valve shaft pivot, a prestressing element being provided within the recess, the bearing piece being prestressed relative to the bearing body in the axial direction A with respect to the valve shaft pivot via the prestressing element.

3. Bearing system according to claim 1, wherein the bearing piece is fixed within the recess of the bearing body in the axial direction A with respect to the valve shaft pivot.

4. Bearing system according to claim 1, wherein the bearing piece and the bearing body have a positively locking connection which acts in the axial direction A with respect to the valve shaft pivot, the positively locking connection
   a) being configured as a one-sided stop, against which the bearing piece bears, or
   b) fixing the bearing piece in the axial direction A with respect to the valve shaft pivot in both directions.

5. Bearing system according to claim 4, wherein the one-sided positively locking connection is configured as a shoulder.

6. Bearing system according to claim 1, wherein at least at operating temperature, the bearing piece being moveable in a circumferential direction U with respect to the valve shaft pivot relative to the bearing body or has a slight play in the radial direction.

7. Bearing system according to claim 1, wherein a cavity is provided within the recess, between the bearing piece and the bearing body, in which cavity lubricant stored.

8. Bearing system according to claim 1, wherein the recess has a beaded edge which forms an undercut and a positively locking connection with the bearing piece in the axial direction A, the bearing piece having a region B1 with a diameter d1 and a region B2 with a diameter d2, where d1>d2, the region B1 bearing against the beaded edge within the recess for the purpose of the formation of the positively locking connection.

9. Bearing system according to claim 7, wherein the bearing piece is of spherical configuration and has a diameter d1, or in that the bearing piece is of pin-shaped configuration and has a shoulder which is arranged within the recess, has the diameter d1, and bears against the edge.

10. Flap valve having a valve housing for connecting to an exhaust gas system and a valve flap with a bearing system according to claim 1.

* * * * *